(12) United States Patent
Siau et al.

(10) Patent No.: US 10,666,877 B2
(45) Date of Patent: May 26, 2020

(54) SYNOPSIZING VIDEOS FROM MULTIPLE MOVING VIDEO CAMERAS

(71) Applicant: MOTOROLA SOLUTIONS, INC., Chicago, IL (US)

(72) Inventors: Carmen Jia Yi Siau, Sabah (MY); Steven John Kerr, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/131,380

(22) Filed: Sep. 14, 2018

(65) Prior Publication Data
US 2020/0092495 A1   Mar. 19, 2020

(51) Int. Cl.
| | |
|---|---|
| H04N 7/01 | (2006.01) |
| G06T 7/246 | (2017.01) |
| H04N 5/265 | (2006.01) |
| H04N 5/272 | (2006.01) |
| G06T 7/33 | (2017.01) |
| H04N 5/247 | (2006.01) |

(52) U.S. Cl.
CPC ............. *H04N 5/265* (2013.01); *G06T 7/248* (2017.01); *G06T 7/33* (2017.01); *H04N 5/247* (2013.01); *H04N 5/272* (2013.01); *H04N 7/0127* (2013.01); *G06T 2207/10016* (2013.01); *G06T 2207/20221* (2013.01); *G06T 2207/30232* (2013.01); *G06T 2207/30236* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 5,982,452 A | 11/1999 | Gregson et al. | |
| 7,738,008 B1 * | 6/2010 | Ball | G06K 9/00214 |
| | | | 348/159 |
| 8,311,277 B2 | 11/2012 | Peleg et al. | |

(Continued)

OTHER PUBLICATIONS

Codreanu, "Video spatio-temporal filtering based on cameras and target objects trajectories—Videosurveillance forensic framework," IEEE (2015) 10th International Conference on Availability, Reliability and Security, pp. 611-617.

(Continued)

*Primary Examiner* — Mark T Monk
(74) *Attorney, Agent, or Firm* — Michael Best & Friedrich LLP (57) ABSTRACT

Methods and systems for synopsizing videos of an incident from multiple moving video cameras. One system includes an electronic processor configured to receive a first video from a first moving video camera, receive a second video from a second moving video camera, determine a first motion characteristic of the first video, and determine a second motion characteristic of the second video. The electronic processor is further configured to generate a comparison between the first motion characteristic and the second motion characteristic, modify the second video based on the comparison such that the second motion characteristic aligns with the first motion characteristic, and generate, after modifying the second video, a combined video including at least a portion of both the first video and the second video.

10 Claims, 7 Drawing Sheets

(56) References Cited

U.S. PATENT DOCUMENTS

| | | | |
|---|---|---|---|
| 2007/0097266 A1* | 5/2007 | Souchard | G06K 9/00711 |
| | | | 348/571 |
| 2009/0324191 A1 | 12/2009 | Reusens et al. | |
| 2010/0169330 A1 | 7/2010 | Albers et al. | |
| 2013/0136306 A1* | 5/2013 | Li | G02B 27/28 |
| | | | 382/103 |
| 2014/0086562 A1 | 3/2014 | Lassman et al. | |
| 2017/0229155 A1* | 8/2017 | Adam | G11B 27/34 |

OTHER PUBLICATIONS

United Kingdom Intellectual Property Office Search Report dated Feb. 18, 2020 of related GB Application No. 1911753.0 (4 pages).

* cited by examiner

SYNOPSIZING VIDEOS FROM MULTIPLE MOVING VIDEO CAMERAS

BACKGROUND OF THE INVENTION

Public safety personnel (for example, first responders, investigators, and the like) responding to an incident may be equipped with video recording devices to document the response to an incident. Video recording devices may also be present in vehicles that are operated by or in which public safety personnel may ride. The videos of an incident may be used subsequent to the incident as evidence in criminal trials or other official investigations or proceedings, or for training purposes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, public safety personnel and vehicles used by public safety personnel may be equipped with video recording devices to record video of an incident. For example, public safety personnel (sometimes referred to as "responders") may use body worn cameras, helmet cameras, or smart glasses to take video of their actions responding to an incident. In addition, other cameras (for example, traffic cameras, surveillance cameras, vehicle dash cameras, and the like) may capture video of an incident. The captured video may include objects of interest (described in more detail below) located at the scene of the incident In some instances, the effectiveness of the response to the incident or the safety of public safety personnel at the incident may depend on whether the incident is under adequate visual surveillance. In other cases, when and by whom an object of interest was observed during the incident may need to be determined subsequent to the incident. For example, video of the incident may be used to identify individuals or objects present at the incident.

Although videos may be recorded by multiple video cameras, any particular video may not have captured the incident completely. For example, objects of interest may be present in a particular recorded video for a limited period of time. Video from other sources that include the incident may provide additional information and details, for example, when the video is recorded at a time different from the first video. Personnel (for example, detectives and investigators) reviewing such videos may find it difficult to piece together the separate videos in sequential order. Instead of reviewing multiple video streams of the incident, it may be useful to create or synopsize a custom video (referred to herein as a "combined video") of the object of interest over the time of the incident. In some instances, it is useful to create a combined video composed of videos from several devices that captured the object of interest at different times. However, some videos may have been taken by a moving video camera (for example, a video camera mounted to a vehicle). Viewing moving videos alongside each other may be difficult for reviewing personnel. Reviewing personnel may be unable to understand details of the incident when the videos are taken from different directions, taken at different speeds, or when both circumstance exists (different direction and different speed). Accordingly, there is a need for a system that can create combined videos composed of videos of an incident from multiple video cameras, including moving video cameras.

One example embodiment provides a video-synopsizing system. The system includes an electronic processor configured to receive a first video from a first moving video camera, receive a second video from a second moving video camera, determine a first motion characteristic of the first video, and determine a second motion characteristic of the second video. The electronic processor is further configured to generate a comparison between the first motion characteristic and the second motion characteristic, modify the second video based on the comparison such that the second motion characteristic aligns with the first motion characteristic, and generate, after modifying the second video, a combined video including at least a portion of both the first video and the second video.

Another example embodiment provides a method for synopsizing videos from a plurality of moving video cameras. The method includes receiving a first video from a first moving video camera, receiving a second video from a second moving video camera, determining a first motion characteristic of the first video, and determining a second motion characteristic of the second video. The method further includes generating a comparison between the first motion characteristic and the second motion characteristic, modifying the second video based on the comparison such that the second motion characteristic aligns with the first motion characteristic, and generating, after modifying the second video, a combined video including at least a portion of both the first video and the second video.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
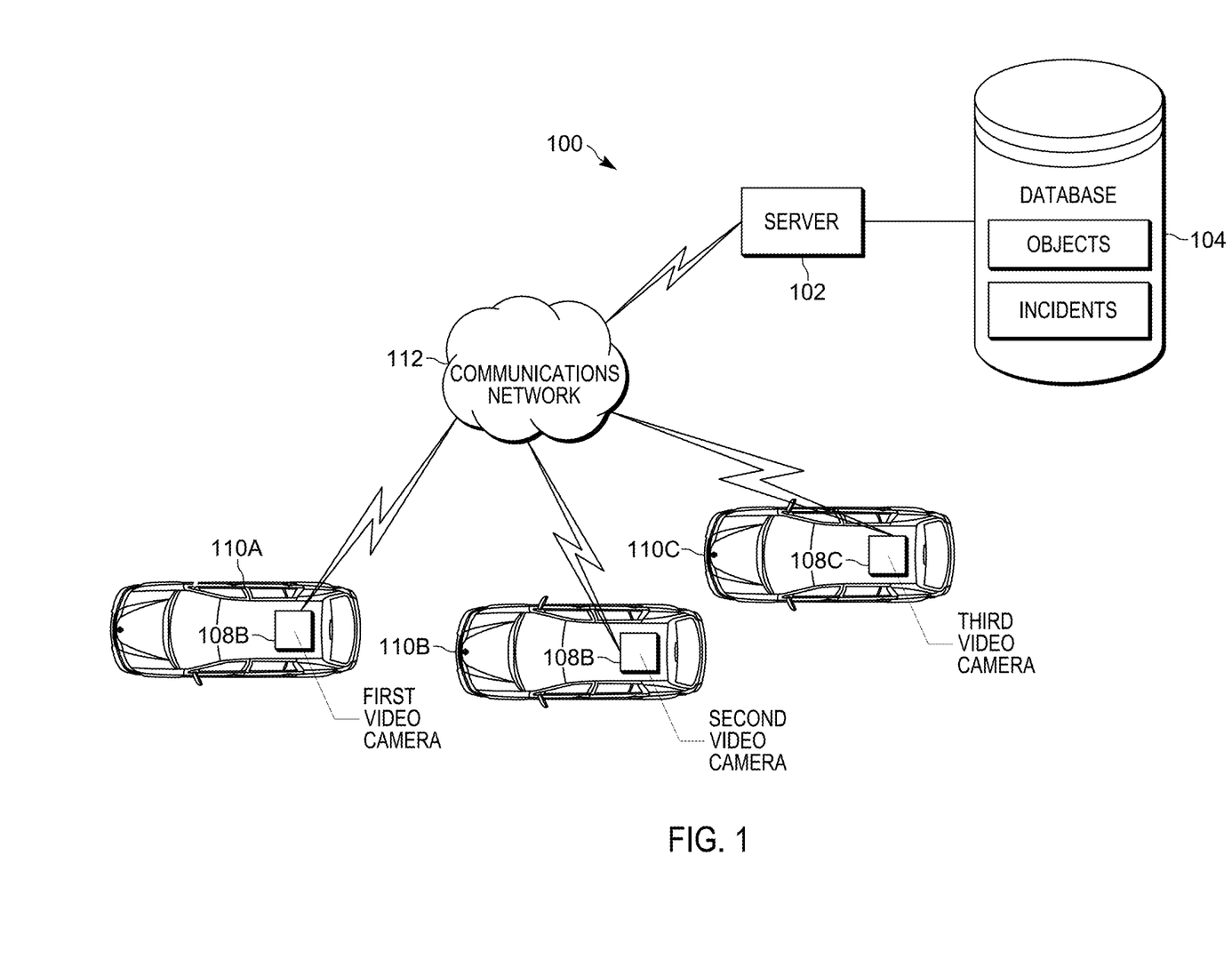
FIG. 1 is a diagram of a system for monitoring an incident in accordance with some embodiments.
Figure 3:
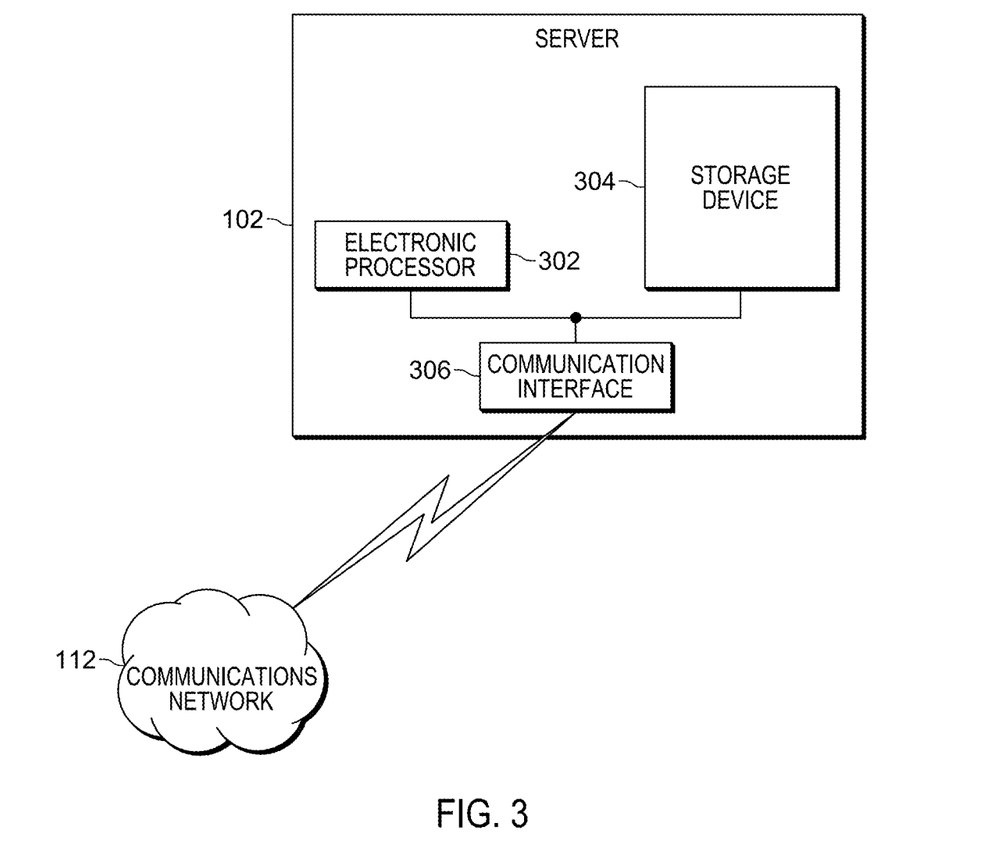
FIG. 3 is a diagram of a server of the system of FIG. 1 in accordance with some embodiments.

FIG. 1 illustrates an example system 100 for monitoring an incident. In the example illustrated, the system 100 includes a server 102 and a database 104. The server 102, described more particularly below with respect to FIG. 3, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system external to the system 100 and accessible by the server 102 over one or more additional networks. In some embodiments, all or part of the database 104 may be locally stored on the server 102. In some embodiments, as described below, the database 104 electronically stores data on objects of interest (described in more detail below) and incidents. In some embodiments, the server 102 and the database 104 are part of a computer-aided dispatch system.

A first video camera 108A, a second video camera 108B, and a third video camera 108C are connected to the server 102 via a communications network 112. In some instances, the communications network 112 includes wireless and wired connections. For example, the communications network 112 may be implemented using a wide area network, such as the Internet, a local area network, such as a Wi-Fi network, and personal area or near-field networks, for example a Bluetooth™ network. Portions of the communications network 112 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

The first video camera 108A, the second video camera 108B, and the third video camera 108C include image capture devices for capturing images and video. Each video camera 108A-C transmits its respective captured video to the server 102, via the communications network 112. One or more of the video cameras 108A-C, described more particularly below with respect to FIG. 2, may be operated by a user, for example, a public safety officer or responder. One or more of the video cameras 108A-C may be mounted to (or integrated into) vehicles 110A-C, respectively. In the example illustrated, the vehicles 110A-C are automobiles. However, unmanned aerial vehicles (UAVs) (often referred to as "drones") and other vehicles (motorcycles, watercraft, etc.) may be used. At least one of the vehicles 110A-C may be operated by an operator within or outside the vehicle 110A-C. In some instances, one or more of the video cameras 108A-C are worn or carried by public safety personnel. In some embodiments, as explained in more detail below, the each of the video cameras 108A-C is configured to determine an object of interest (described in more detail below) within the captured video. For ease of description, when describing the video cameras 108A-C, a reference to the video camera 108A is made. It should be understood that, in certain embodiments, video cameras 108B and 108C are configured similar to the video camera 108A.

An incident may be the scene of a crime, fire, accident, medical emergency, natural disaster or other public safety incident. As noted above, the response to the incident by public safety personnel may be recorded on video by the video cameras 108A-C. In some circumstances, the recorded video captures video of an object of interest during the incident.

An object of interest is an object related to the incident and is involved in or relevant to the response to or investigation of the incident. Objects of interest may include people, vehicles, buildings, or portions of buildings, and other physical objects involved or potentially involved in the incident. Objects of interest may include, for example, automobiles (for example, in the case of a traffic accident), weapons (for example, in the case of a crime scene), people (for example, victims or suspects), buildings, or portions of buildings (for example, doors and windows). Objects of interest may also be tangible things not commonly thought of as objects, but which are still relevant to the response to or subsequent investigation of an incident response (for example, fluids leaked from automobiles, debris from damaged property, and blood). The incident may include more than one object of interest. While the video cameras 108A-C are described as moving during their recording of the incident, the incident (or object(s) of interest thereof) may either be moving or stationary.

The server 102 includes software and hardware to electronically detect and classify objects within images and video streams captured by the video cameras 108A-C in communication with the server 102, (for example, video processors and object classifier algorithms). Object classification is known in the art, and will not be described in detail herein. The detected objects of interest are assigned object identifiers, and stored in the database 104. In some embodiments, at least one of the video cameras 108A-C includes software and hardware to electronically detect and classify objects within images and video streams.

Figure 2:
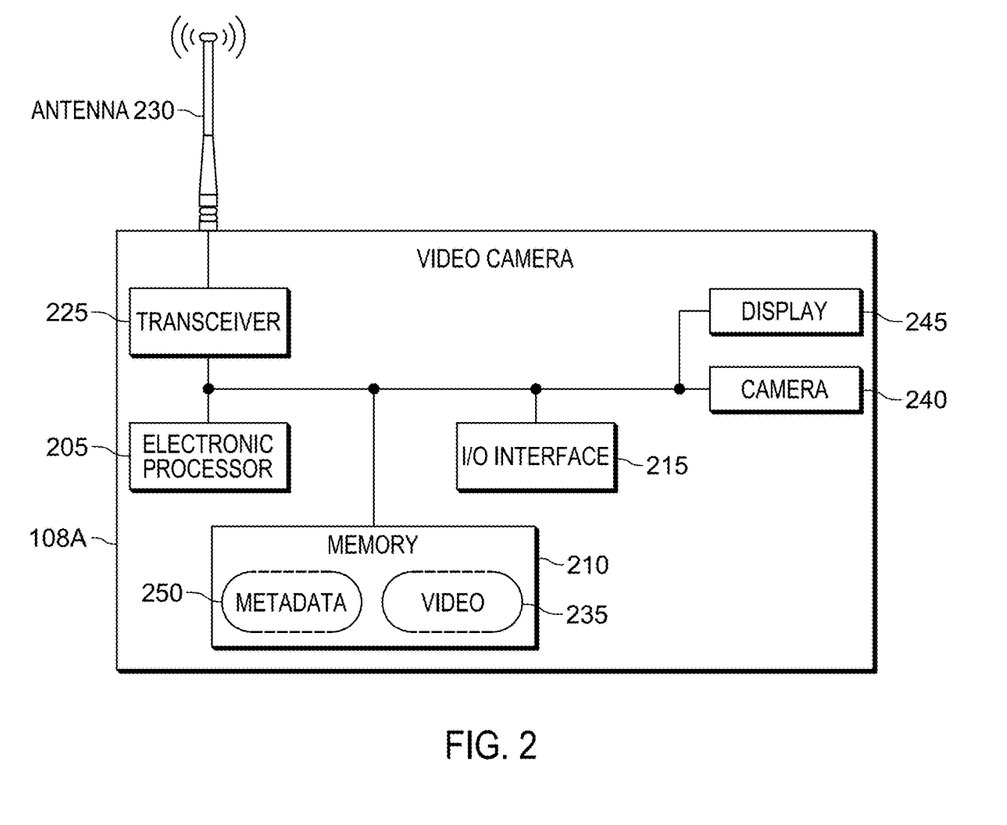
FIG. 2 is a diagram of a video camera in accordance with some embodiments.

FIG. 2 illustrates an example video camera 108A. As mentioned above, in certain embodiments, each of the video cameras 108B and 108C include similar components and are configured similarly to the video camera 108A. In the embodiment illustrated, the video camera 108A includes an electronic processor 205, a memory 210, an input/output interface 215, a transceiver 225, an image sensor 240, and a display 245. The illustrated components, along with other various modules and components are coupled to each other by or through various connections including one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes, in one embodiment, a program storage area and a data storage area. The program storage area and the data storage area can include combinations of different types of memory, as described herein. In the embodiment illustrated, the memory 210 stores, among other things, one or more videos 235 and metadata 250 of one or more videos captured by the image sensor 240. The metadata 250 includes additional data relative to a particular video of the one or more videos 235. The metadata 250 includes, for example, timestamps (when the one or more videos 235 were made in local time), an identifier of the video camera 108A the particular video is originally from, and the like. In some embodiments, as explained below, the video camera 108A or the server 102 may be configured to add an object flag or identifier indicating a particular object of interest included in the particular video.

The input/output interface 215 is configured to receive input and to provide system output. The input/output interface 215 obtains information and signals from, and provides information and signals to, (for example, over one or more wired and/or wireless connections) devices both internal and external to the video camera 108. For example, the input/output interface 215 may be coupled to an accelerometer or navigational sensor, for example a global positioning system, (not shown) configured to measure and record speed and location, respectively. Such components may be included in the video camera 108A or external to the video camera 108A (for example, integrated or coupled to the vehicle 110A).

The electronic processor 205 is configured to control the transceiver 225 to transmit and receive video and other data to and from the video camera. The electronic processor 205 encodes and decodes digital data sent and received by the transceiver 225. The transceiver 225 transmits and receives signals to and from, for example, the communications network 112 using an antenna 230. The electronic processor 205 and the transceiver 225 may include various digital and analog components, which for brevity are not described herein and which may be implemented in hardware, software, or a combination of both. In some embodiments, the transceiver 225 includes separate transmitting and receiving components, for example, a transmitter and a receiver separate from each other.

In some embodiments, the electronic processor 205 determines the object of interest captured in the video based on a reference image or command from the server 102 or an input from a user of the video camera 108A or another video camera 108A. The electronic processor 205 may use image recognition techniques, algorithms, and hardware, as mentioned above, to determine a portion of the video (referred to herein as a video clip) in which the object is present. The electronic processor 205 may identify objects based on one or more object classifiers stored in the database 104. In some embodiments, the object classifier is created by the electronic processor 205 based on an input from the user of the video camera. In some embodiments, the object classifier is stored locally within the memory 210, for example, as part of the metadata 250 of the particular video.

The image sensor 240 is an image capture device for capturing images and video, including a portion of or the entire incident, by, for example, sensing light in at least the visible spectrum. The image sensor 240 communicates the captured images and video streams to the electronic processor 205 via the input/output interface 215. It should be noted that the terms "image" and "images," as used herein, may refer to one or more digital images captured by the image sensor 240, or processed by the electronic processor 205, or displayed on the display 245. Further, the terms "image" and "images," as used herein, may refer to still images or sequences of images or frames (that is, a video). As illustrated, the image sensor 240 is integrated into the video camera 108A. In alternative embodiments, the image sensor 240 is separate from the first video camera 108A, and communicates captured images to the video camera 108A via a wired or wireless connection. For example, the image sensor 240 may be integrated into a body-worn camera or smart glasses, which communicate with the video camera 108A.

In some embodiments, the image sensor 240 may be a stereoscopic camera, or the video camera 108A may include a stereoscopic camera. In such embodiments, the video camera 108A can capture three-dimensional information about the incident and the objects of interest. In some embodiments, three-dimensional information may be captured using radar sensors or infrared ranging sensors (not shown).

The display 245 is a suitable display such as, for example, a liquid crystal display (LCD) touch screen, or an organic light-emitting diode (OLED) touch screen. The electronic processor 205 generates a graphical user interface (GUI) (for example, generated by the electronic processor 205, from instructions and data stored in the memory 210) that is presented on the display 245. Among other things, the GUI provides mechanisms (for example, selectable icons) that enable a user to interact with the video camera. In some embodiments, the display 245 is part of an electronic device separate from the video camera 108A (for example, a computer, a mobile communication device, a tablet, and the like). In some embodiments, the display 245 is part of the server 102.

In some embodiments, the video camera 108A operates using, among other things, augmented reality technology, where live images are captured by the image sensor 240 and displayed (for example, on the display 245) with text, graphics, or graphical user interface elements superimposed on or otherwise combined with the live images.

As described in detail below, the video camera 108A is capable of receiving and processing images captured by the image sensor 240, and displaying processed images in a graphical user interface on the display 245. Computerized image capturing and processing techniques are known, and will not be described in detail.

FIG. 3 illustrates the server 102 in more detail. In the example provided, the server 102 includes an electronic processor 302, a storage device 304, and a communication interface 306. The electronic processor 302, the storage device 304, and the communication interface 306 communicate over one or more communication lines or buses, wirelessly, or a combination thereof.

The electronic processor 302 may include a microprocessor, application-specific integrated circuit (ASIC), or another suitable electronic device. The storage device 304 includes a non-transitory, computer-readable storage medium. The communication interface 306 may include a transceiver (for example, a Wi-Fi or Ethernet transceiver) for communicating over the communications network 112 and, optionally, one or more additional wired or wireless communication networks or connections. The electronic processor 302 is configured to retrieve from the storage device 304 and execute, among other things, software related to the processes and methods described herein.

The server 102 receives and processes videos from the video cameras 108A-C. In some embodiments, the electronic processor 302 performs one or more similar processes as those described above in regard to the electronic processor 205. For example, in some embodiments, the electronic processor 302 (instead of or in addition to the electronic processor 205) is configured to identify one or more objects of interest within the received videos. The electronic processor 302, upon identifying one or more objects of interest in a video, may generate metadata 250 associated with the particular video that includes an identifier. The electronic processor 302 may include in the metadata 250 associated with the particular video, an object flag or identifier indicating that the video contains a particular object of interest.

As noted above, while incidents may be monitored by several different video cameras, it may be challenging to review each video to not only find the particular video clip that captures the incident (for example, where the object of interest is present in the video) but also to understand the timing of video clip where the object of interest is present relative to another video or video that may have been recorded at different times. It may also be visually challenging for the reviewer when one or more of the videos are from video camera sources that were moving in different directions or speeds during recording.

Figure 4:
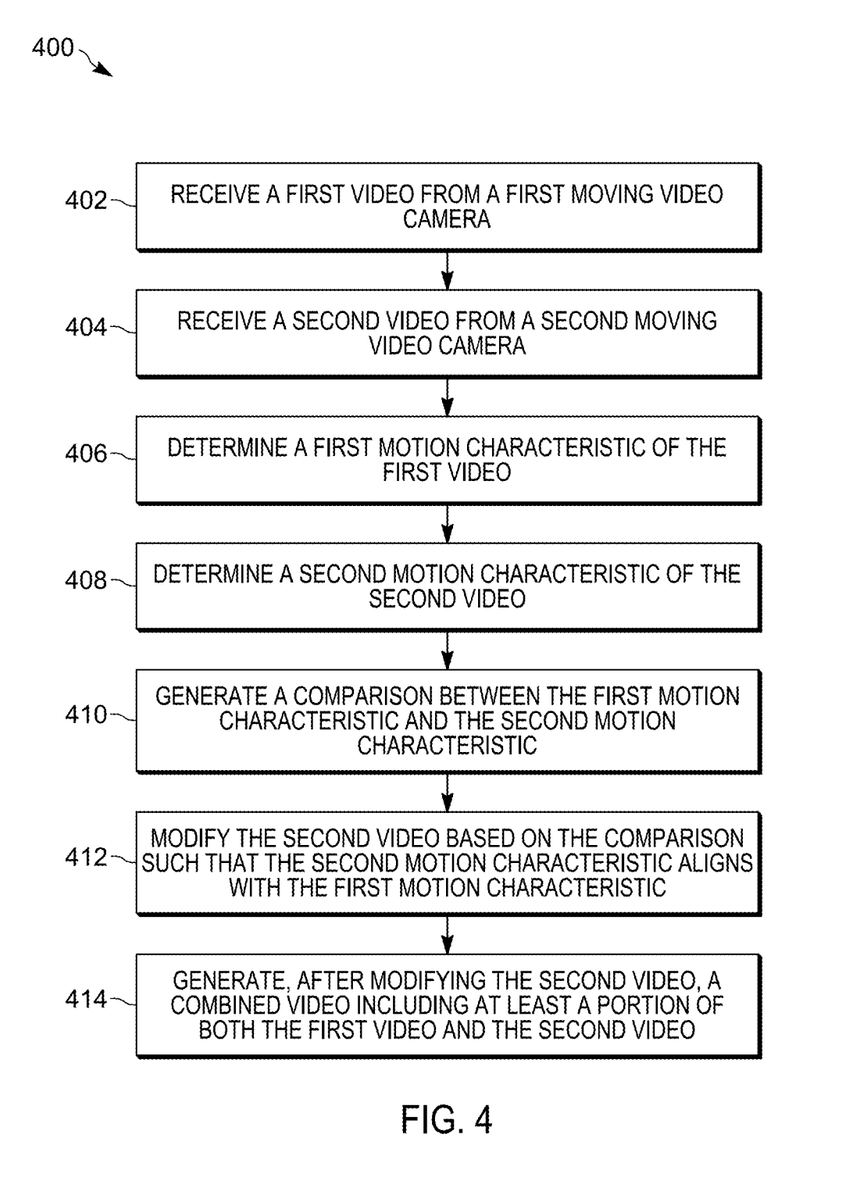
FIG. 4 is a flowchart of a method for synopsizing videos of an incident from the moving video cameras of the system of FIG. 1 in accordance with some embodiments.

FIG. 4 illustrates a method 400 for synopsizing videos of an incident from a plurality of moving video cameras. The method 400 is described as being performed by the server 102 and, in particular, the electronic processor 302. However, it should be understood that in some embodiments, portions of the method 400 may be performed by other devices, including for example, one or more of the video cameras 108A-C. For ease of description, portions of the method 400 are described in terms of a single object of interest (for example, the object of interest 602 of FIG. 6). It should be understood that in some embodiments, multiple objects of interest may be present. Also, for ease of description, the method 400 is described in terms of a first and a second video from a first and a second video camera. However, it should be understood that, in other embodiments, the method 400 may be performed with more than two videos from more than two video cameras. In some embodiments, the method 400 (as well as any related video processing, for example identifying an object of interest within a video) may be performed while the incident is occurring, to provide near real time feedback to a viewer. In other embodiments, the method 400 may be performed subsequent to the incident, and may be used to assist investigators reviewing the incident response. For ease of description, the following examples are described using the terms "video", "video clip", and "camera," which may refer to the videos 501A-C (FIG. 5), video clips 502A-C, and the video cameras 108A-C, respectively.

In the example illustrated in FIG. 4, at block 402, the electronic processor 302 receives a first video (for example, a first video 501A of FIG. 5) from a first moving video camera (for example, the first video camera 108A). At block 404, the electronic processor 302 receives a second video (for example, a second video 501B of FIG. 5) from a second moving video camera (for example, the second video camera 108B). In some embodiments, the electronic processor 302 receives the video, via the communication interface 306 directly from the video camera or indirectly through another electronic communications device (for example, from a laptop or a smartphone). In some embodiments, at least one of the videos is a previously received video retrieved from the database 104 of the system 100 (FIG. 1) or the storage device 304 of the video camera.

Figure 5:
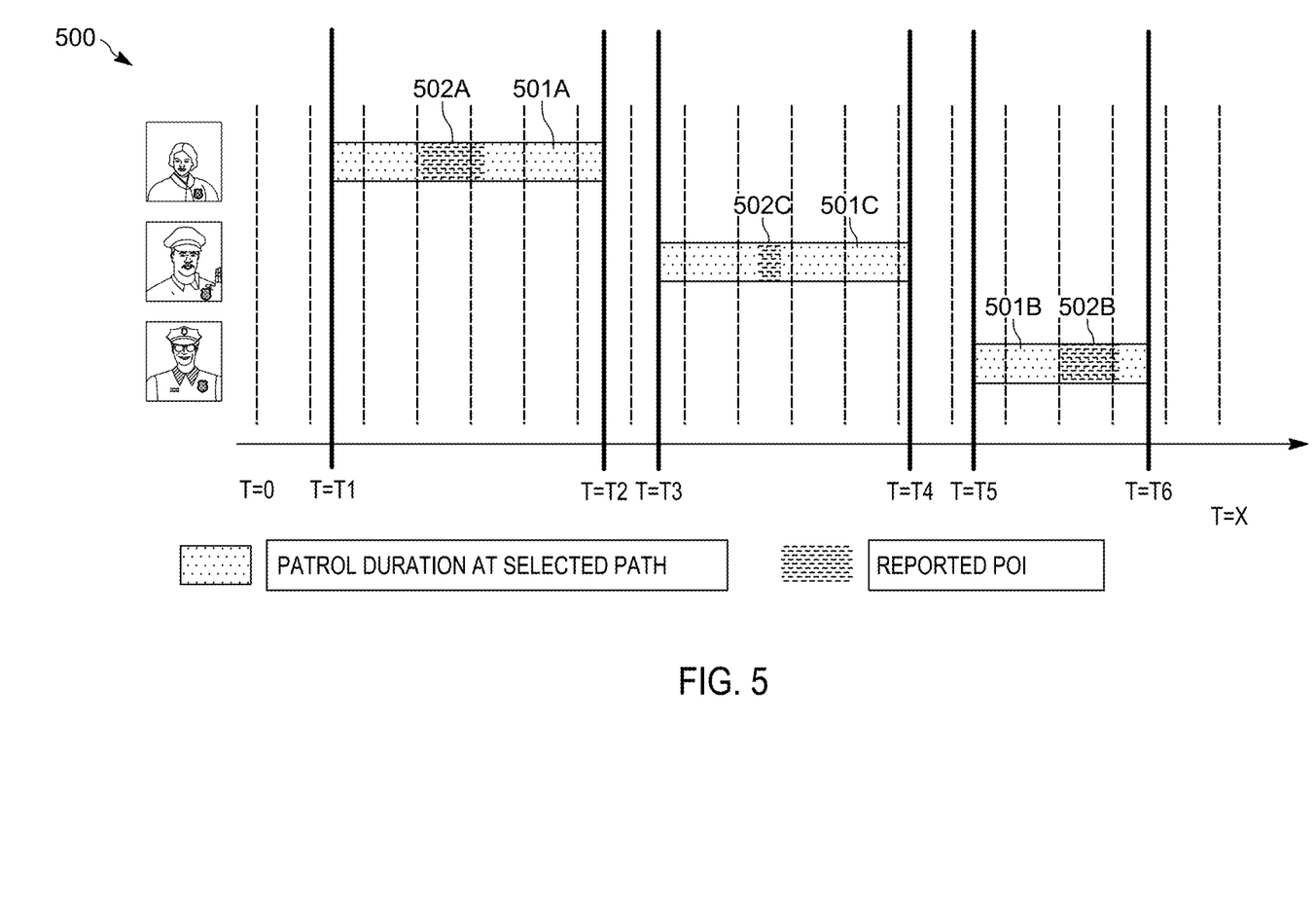
FIG. 5 is a timeline of videos captured by each of the video cameras of the system of FIG. 1 in accordance with some embodiments.

FIG. 5 illustrates a timeline 500 of videos 501A-C captured by each of the video cameras 108A-C, respectively. In the illustrated example, the videos 501A-C are taken at different times. The video 501A captured by the video camera 108A is taken first at time $T_1$ and ends at a later time $T_2$. The video 501C captured by the video camera 108C is taken first at time $T_3$ following $T_2$ and ends at a later time $T_4$. The video 501B captured by the video camera 108B is taken from $T_4$-$T_5$. Although in the illustrated embodiment, the videos 501A-C do not overlap in time, it should be understood in some embodiments one or more of the videos 501A-C may overlap in time.

In some embodiments, the electronic processor 302 is configured to determine a portion of the video or video clip to use in the method 400. In other embodiments, the electronic processor 302 is configured to determine a video clip of the video that includes the object of interest 602 and use the video clip of the object of interest 602 as the video in the method 400. In the illustrated example, video clips 502A-C are the portions of the videos 501A-C, respectively, that include the object of interest 602. In some circumstances, more than one video clip in a single video may be used in the method 400 (for example, when the video contains more than one video clip of an object of interest). The video clips 502A-C from a single video may be processed similar to as if the video clips 502A-C were from separate videos.

Returning to FIG. 4, at block 406, the electronic processor 302 determines a first motion characteristic of the first video 501A and, at block 408, determines a second motion characteristic of the second video 501B. The motion characteristic is either the speed of the video camera or the direction that the video camera is moving during the video. In some embodiments, both speed and direction are taken into consideration as characteristics. In some embodiments, the first motion characteristic and the second motion characteristic are determined based on an object of interest common to the first video 501A and the second video 501B (explained below in regard to FIG. 6). The electronic processor 302 (at block 410) generates a comparison between the first motion characteristic and the second motion characteristic. The electronic processor 302 then modifies (at block 412) the second video 501B based on the comparison such that the second motion characteristic aligns (or does not contradict) with the first motion characteristic. In other words, the electronic processor 302 modifies the second video 501B so that, when viewing the first and second videos 501A and 501B sequentially, there is little or no visual contradiction between the two (explained in more detail below in regard to FIG. 6). It should be understood that the modification of the second video 501B is in terms of at least a portion of a frame of the video 501B. For example, in some embodiments, the order or speed (or both) of several frames is modified. In some embodiments, a portion (or area) of one or more frames of the video is modified.

Figure 6:
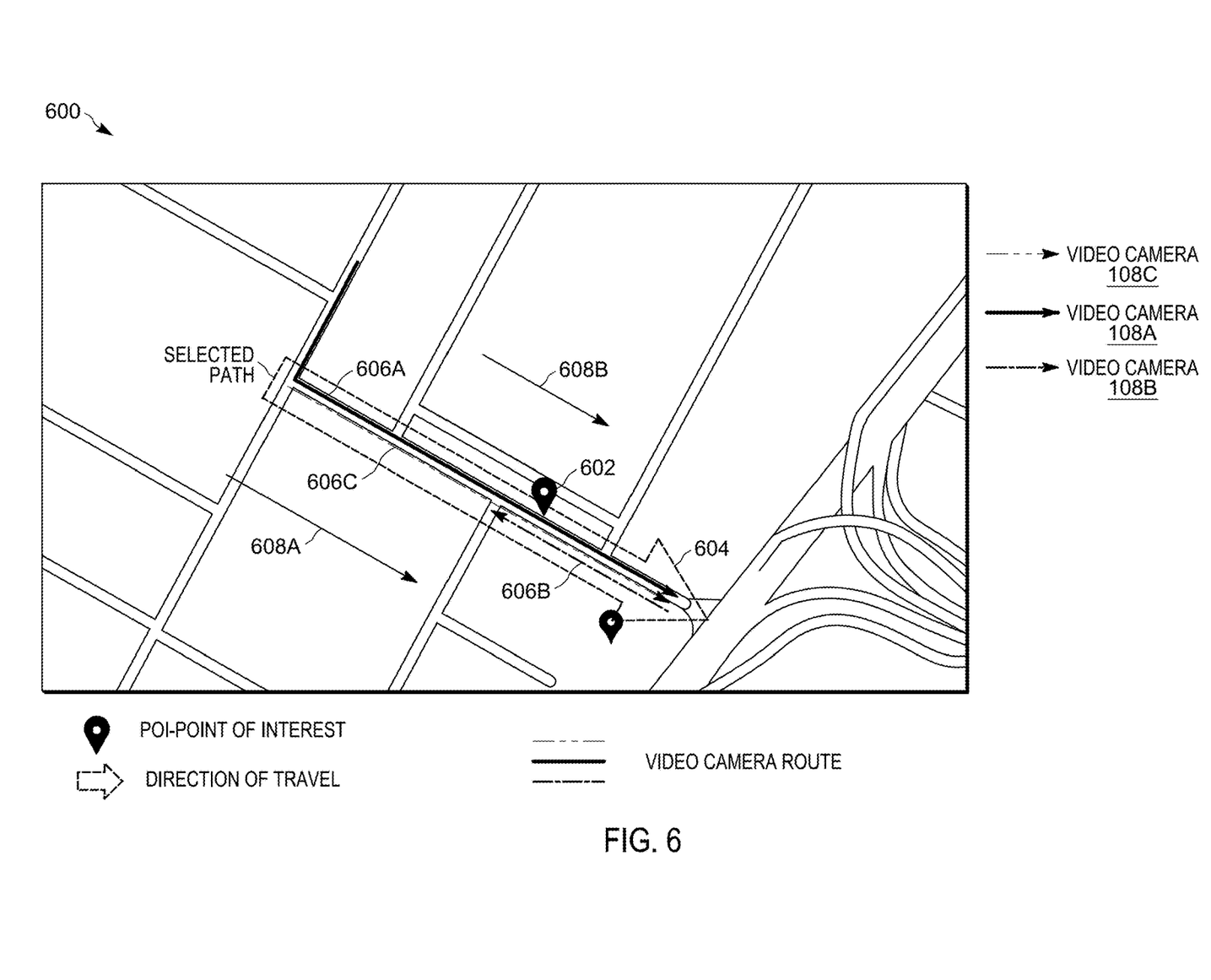
FIG. 6 is a map illustrating the incident and video cameras of FIG. 1 in accordance with some embodiments.

The manner in which video is modified may be better understood by reference to FIG. 6. FIG. 6 is a map 600 illustrating an incident where the object of interest 602 (in the illustrated example, a vehicle) is moving along a path 604. The object of interest 602 is captured in a video by each of the video cameras 108A-C. The video cameras 108A-C each travel along the path 604. The routes 606A-C each indicate the path of travel of each of the video cameras 108A-C respectively during their respective video of the object of interest 602. The routes 606A and 606C of the video cameras 108A and 108C respectively are in the same direction 608A while the route 606B of the video camera 108B is in an opposite direction 608B. Since the route 606A and 606C of the video cameras 108A and 108C are in a common direction 608A, the motion characteristic (direction) of the video captured by the video cameras 108A and 108C align with each other. Since the route 606B of the video camera 108B is in a direction opposite to the route 606A and 606C of the video cameras 108A and 108C, the motion characteristic (direction) if the video captured by the video camera 108B does not align with the motion characteristic of either video 501A or 501C from video camera 108A or 108C. Accordingly, at block 412 (FIG. 4), the electronic processor 302 may modify the video 501B from the video camera 108B by reversing some or all of the video 501B. For example, in the illustrated embodiment, the video camera 108B may be positioned in the rear of the vehicle 110B. This would make it appear that the video camera 108B is moving in the direction 608A during the video 501B, same as the video camera 108A during video 501A.

In some embodiments, the first motion characteristic and the second motion characteristic are determined based on the object of interest 602 common to the first video and the second video. For example, when the object of interest 602 is recorded by the video camera 108B travelling the route 606B, in the direction 608B opposite the direction 608A of the path 604 of the object of interest 602 and the routes 606A and 606C of video cameras 108A and 108C, the images of the object of interest 602 captured in the video 501B of the video camera 108B show the object of interest 602 moving away from the video camera 108B. The modification of the video 501B from the video camera 108B may be reversed in order to make it appear that the object of interest 602 is moving in the modified video 501B in such a way that is consistent with the movement of the object of interest 602 in the videos 501A and 501C from the video cameras 108A and 108C. For example, the direction of the video 501B from the video camera 108B is modified such that the object of interest 602 appears to be steadily moving in front of the vehicle 110B, as if the vehicle 110B is following next to the vehicle 110A in the direction 608A.

When the speed of the video camera 108B is different from that of the first video camera 108A during the video 501A (for example, relative to the movement of the object of interest 602 as it appears in the first video), the speed of the second video may be increased or decreased to align with the speed of the first video. For example, the vehicles 110A and 110C, although moving in the same direction 608A after the object of interest 602, may be travelling at different speeds. Accordingly, the speed of the video from the video camera 108C is either increased or decreased (depending on the speed of the vehicles 110A and 110C) such that the object of interest 602 appears to be moving at approximately the same speed it appears to be moving in the video 501A of the video camera 108A.

The electronic processor 302 may determine the motion characteristic of a video using one or more speed estimation methods based on video images. For example, the electronic processor 302 may be configured to estimate the speed, direction, or both of the video camera based on the speed and movement of a certain pixel in each frame of at least a portion of the video (known as pixel tracking). In some embodiments, the electronic processor 302 may determine the motion characteristic based on information from the video camera (for example, using information from an accelerometer, a navigational sensor, or the like within or connected to the video camera). In other embodiments, the electronic processor 302 may use speed and directional data from an electronic control unit (not shown) or electronic logging device (not shown) of the vehicle in which the video camera is located.

In some embodiments, the electronic processor 302 is configured to modify one or more objects of the second video 501B (in other words objects in the video 501B other than the object of interest 602). The modification may be similar to the modification of the video 501B described above, where electronic processor 302 determines an alignment of a motion characteristic of the object with the first motion characteristic and modifies the motion characteristic of the object to align with the motion characteristic of the first video 501A. In some embodiments, the video 501B is modified so that the object no longer appears in the video 501B. The modification of an object within a video may be desirable when the object is visually distracting or contradicts an aspect of the video. For example, when the second video 501B, before modification, includes an object moving forwards (for example, a person walking forwards), reversing some or all of the video 501B would cause the object to appear as if it is moving backwards. Accordingly, the object may be 1) modified to appear as if it is still moving forward or 2) removed from the video 501B.

Returning to FIG. 4, at block 414, the electronic processor 302 generates, after modifying the second video 501B, a combined video including at least a portion of both the first video 501A and the second video 501B. The order of the videos (modified at block 412 or not) included in the combined video may be the order in which the videos were recorded. For example, returning to FIG. 5, the video 501A (or a portion thereof, for example video clip 602A) would appear first in the combined video as video 501A is the earliest recording. The video 501C would follow the video 501A and the video 501B would follow the video 501C. The electronic processor 302 may be configured to determine the time the video was recorded based on the metadata 250 associated with the video. In some embodiments, the electronic processor 302 is further configured to use video from stationary video cameras (for example, security cameras, traffic cameras, and the like) in the combined video. The electronic processor 302 may be configured to modify video from such devices similar to that of the videos 501A-C described above.

As explained above, one or more of the videos included in combined video may be modified so that the motion characteristic in one video is consistent with the motion characteristic of the other video(s). In some embodiments, the electronic processor 302 is configured to receive a user input selecting the motion characteristic (either or both speed and direction) of the combined video. The videos may be modified based of the user input. For example, the electronic processor 302 may provide a graphical map on a user interface of a display (for example, display 245 of the video camera 108) indicating the routes of the video cameras and the location (and in some circumstances, direction) of the incident. The user interface may be similar to the map 600 of FIG. 6. The user may, for example, draw an arrow in the direction in which the motion characteristic of the combined video is desired (for example, either direction 608A or 608B). The user may also enter the speed of the combined video. The electronic processor 302 then performs the method 400 based on the received motion characteristics.

In some embodiments, the electronic processor 302 is configured to add a visual element to one or more of the videos in the combined video. The visual element may be a window, a color, text, or some combination thereof indicating information regarding of visually highlighting a particular element of the video. For example, the visual element may be a timestamp of the video, the speed at which the video camera is moving at the time during which the video is captured, and the object of interest 602, and the like. The electronic processor 302 superimposes the visual element over one or more frames of the particular video within the combined video.

Figure 7:
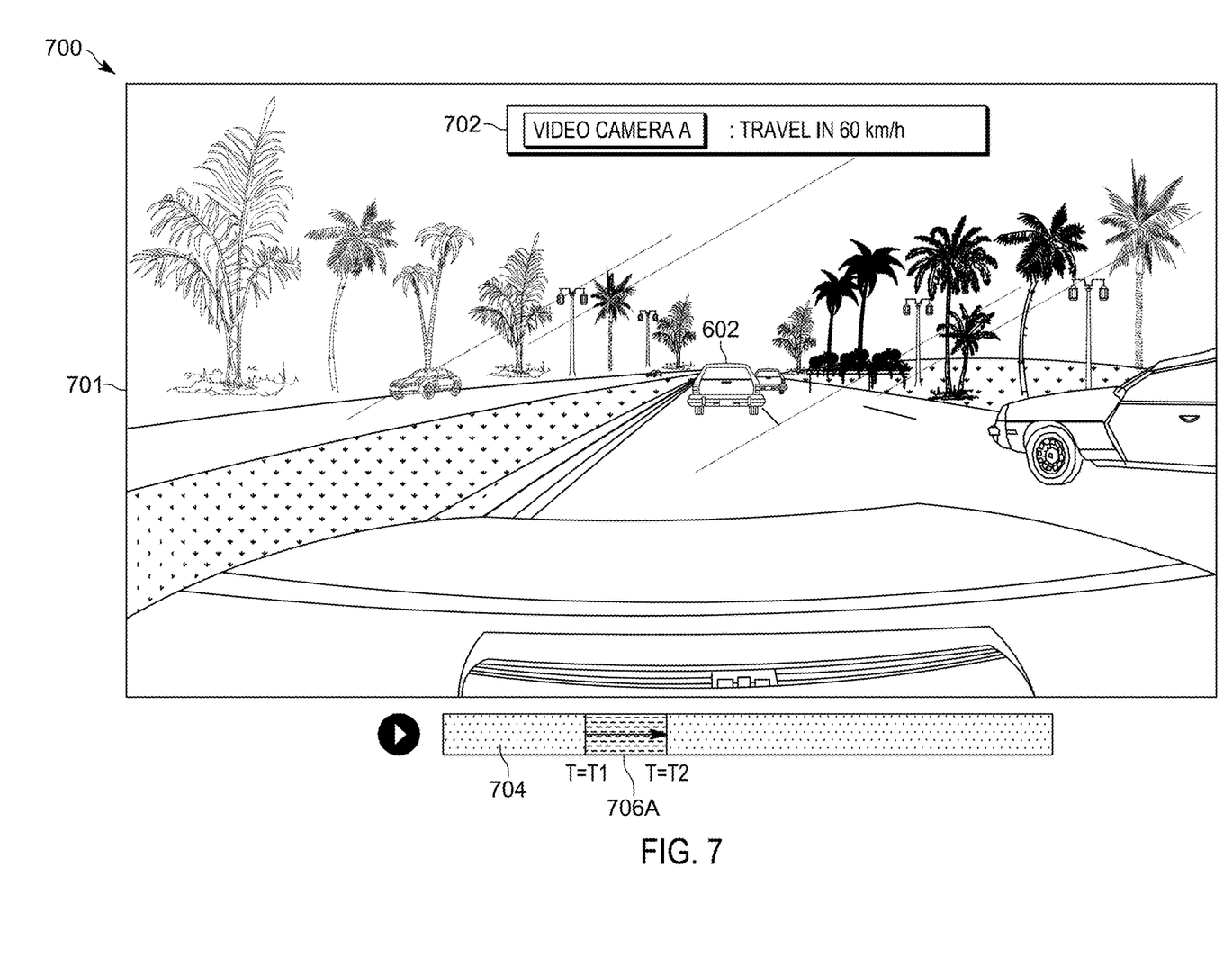
FIG. 7 is a display showing the combined video of the method of FIG. 4 in accordance with some embodiments.

In FIG. 7, a combined video 700 is shown presented on a display 701. The combined video 700 includes a visual element 702 indicating the speed of the video camera. In some embodiments, the electronic processor 302 may further be configured to provide a visual element indicative of the timeline of the combined video 700, for example timeline 704. In the illustrated embodiment, the timeline 704 may highlight the duration 706A of a first video 501A (as well as the other videos included within the combined video 700). This allows the viewer to identify the particular video being shown in the combined video 700.

In some embodiments, the display 701 is part of a computing device used by, for example, a supervisor monitoring the incident response in real time or reviewing the incident response after the fact. In some embodiments, the display 701 is part of the server 102. In further embodiments, the display 701 is part of a video device (for example, the display 245 of the video camera 108A) used by a watcher during the incident.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A video-synopsizing system comprising:
an electronic processor configured to
receive a first video from a first moving video camera,
receive a second video from a second moving video camera,
determine a first motion characteristic of the first video,
determine a second motion characteristic of the second video,
generate a comparison between the first motion characteristic and the second motion characteristic,
modify the second video based on the comparison such that the second motion characteristic aligns with the first motion characteristic, and generate, after modifying the second video, a combined video including at least a portion of both the first video and the second video wherein the first motion characteristic includes a first direction in which the first moving video camera is moving and the second motion characteristic includes a second direction in which the second moving video camera is moving that is substantially opposite of the first direction, and the electronic processor is further configured to modify the second video to align the second motion characteristic with the first motion characteristic by at least one selected from the group consisting of reversing, increasing a speed of, and decreasing the speed of at least a portion of the second video.

2. The system of claim 1, wherein the first motion characteristic and the second motion characteristic are determined based on an object of interest common to the first video and the second video.

3. The system of claim 2, wherein the electronic processor is further configured to add a visual element to the second video, the visual element indicating at least one selected from the group consisting of a timestamp of the second video, a speed at which the second moving video camera is moving at a time during which the second video is captured, and the object of interest.

4. The system of claim 1, wherein the electronic processor is further configured to modify an element within the second video.

5. The system of claim 4, wherein the electronic processor is configured to determine an alignment of the element with the first motion characteristic.

6. A method for synopsizing videos from a plurality of moving video cameras, the method comprising:
receiving a first video from a first moving video camera;
receiving a second video from a second moving video camera;
determining a first motion characteristic of the first video;
determining a second motion characteristic of the second video;
generating a comparison between the first motion characteristic and the second motion characteristic;
modifying the second video based on the comparison such that the second motion characteristic aligns with the first motion characteristic;
and generating, after modifying the second video, a combined video including at least a portion of both the first video and the second video wherein the first motion characteristic includes a first direction in which the first moving video camera is moving and the second motion characteristic includes a second direction in which the second moving video camera is moving that is substantially opposite of the first direction, and modifying the second video to align the second motion characteristic with the first motion characteristic by at least one selected from the group consisting of reversing, increasing a speed of and decreasing the speed of at least a portion of the second video.

7. The method of claim 6, wherein the first motion characteristic and the second motion characteristic are determined based on an object of interest common to the first video and the second video.

8. The method of claim 7, wherein the method further includes adding a visual element to the second video, the visual element indicating at least one selected from the group consisting of a timestamp of the second video, a speed at which the second moving video camera is moving at a time during which the second video is captured, and the object of interest.

9. The method of claim 6, wherein the method further includes modifying an element within the second video.

10. The method of claim 9, wherein the method further includes determining an alignment of the element with the first motion characteristic.

* * * * *